(12) United States Patent
Komori et al.

(10) Patent No.: US 11,702,049 B2
(45) Date of Patent: Jul. 18, 2023

(54) VEHICLE BEHAVIOR CONTROL DEVICE AND VEHICLE BEHAVIOR CONTROL METHOD

(71) Applicant: HONDA MOTOR CO., LTD., Tokyo (JP)

(72) Inventors: Kenji Komori, Wako (JP); Shinsuke Odai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 17/155,622

(22) Filed: Jan. 22, 2021

(65) Prior Publication Data
US 2021/0229642 A1    Jul. 29, 2021

(30) Foreign Application Priority Data
Jan. 27, 2020   (JP) .................................. 2020-010519

(51) Int. Cl.
| | | |
|---|---|---|
| B60T 7/22 | (2006.01) | |
| G08G 1/16 | (2006.01) | |
| B60T 8/17 | (2006.01) | |
| B60T 8/24 | (2006.01) | |

(52) U.S. Cl.
CPC .................. *B60T 7/22* (2013.01); *B60T 8/17* (2013.01); *B60T 8/241* (2013.01); *G08G 1/16* (2013.01); *B60T 2201/024* (2013.01); *B60T 2230/03* (2013.01); *B60T 2250/00* (2013.01)

(58) Field of Classification Search
CPC combination set(s) only.
See application file for complete search history.

(56) References Cited

U.S. PATENT DOCUMENTS

| | | | |
|---|---|---|---|
| 2015/0360655 A1* | 12/2015 | Odate | B60W 10/18 701/70 |
| 2017/0158175 A1* | 6/2017 | Fairfield | B60W 60/00276 |
| 2019/0135246 A1* | 5/2019 | Jeong | B60T 8/171 |

FOREIGN PATENT DOCUMENTS

| | | | | |
|---|---|---|---|---|
| EP | 3138706 A1 * | 3/2017 | | B60G 17/0164 |
| JP | 2005-254944 A | 9/2005 | | |
| KR | 100192316 B1 * | 1/1999 | | B60T 7/00 |

* cited by examiner

*Primary Examiner* — Maceeh Anwari
(74) *Attorney, Agent, or Firm* — Carrier, Shende and Associates, P.C.; Fulchand P. Shende; Joseph P. Carrier

(57) ABSTRACT

A vehicle behavior control device is equipped with an other vehicle detection unit that detects another vehicle, a collision prediction unit that predicts that the other vehicle will collide with a side surface of a user's own vehicle, a physical quantity determination unit that determines a physical quantity relationship between relative physical quantities of the other vehicle and the user's own vehicle, and a brake control unit that is capable of individually and independently controlling brakes corresponding to respective vehicle wheels and that causes a braking force of the brakes on a collision side and a braking force of the brakes on a non-collision side to differ from each other, in accordance with the physical quantity relationship determined by the physical quantity determination unit, in the case that a collision is predicted by the collision prediction unit.

5 Claims, 5 Drawing Sheets

VEHICLE BEHAVIOR CONTROL DEVICE AND VEHICLE BEHAVIOR CONTROL METHOD

CROSS-REFERENCE TO RELATED APPLICATION

This application is based upon and claims the benefit of priority from Japanese Patent Application No. 2020-010519 filed on Jan. 27, 2020, the contents of which are incorporated herein by reference.

BACKGROUND OF THE INVENTION

Field of the Invention

The present invention relates to a vehicle behavior control device and a vehicle behavior control method, which control the behavior of a user's own vehicle when another vehicle is predicted to collide with a side surface of the user's own vehicle.

Description of the Related Art

In Japanese Laid-Open Patent Publication No. 2005-254944, a device is disclosed that reduces a load applied to a vehicle body on a side where a collision takes place, in the case that another vehicle has collided (a side collision has occurred) with a side surface of the user's own vehicle. In such a device, a predicted time of the side collision and a predicted position (front portion, middle portion, rear portion) of the side collision are calculated. In addition, the device selects either the front wheel or the rear wheel on a side where the collision does not occur based on the predicted position of the side collision, and in a period from a predetermined time prior to the predicted time of the side collision and until an acceleration of the vehicle body becomes less than or equal to a predetermined value, forcibly controls the braking force of the selected wheel so as to become higher than the braking force of the other wheels.

SUMMARY OF THE INVENTION

In the device of Japanese Laid-Open Patent Publication No. 2005-254944, the load applied to the vehicle body due to a yaw motion being generated in the case that the other vehicle collides with the side surface of the user's own vehicle is reduced. On the other hand, the device of Japanese Laid-Open Patent Publication No. 2005-254944 does nothing to stabilize the behavior of the vehicle in a roll direction.

Further, in the device of Japanese Laid-Open Patent Publication No. 2005-254944, there is a requirement to precisely control the braking forces of four brakes, and thus the control is complicated.

The present invention has been devised taking into consideration the aforementioned problems, and has the object of providing a vehicle behavior control device and a vehicle behavior control method, in which with a simple control, it is possible to stabilize the behavior of a user's own vehicle in a roll direction, in the case that another vehicle collides with a side surface of the user's own vehicle.

A first aspect of the present invention is characterized by a vehicle behavior control device that controls a behavior of a vehicle when another vehicle is predicted to collide with a side surface of the vehicle, the vehicle behavior control device comprising:

an other vehicle detection unit configured to detect the another vehicle;

a collision prediction unit configured to predict that the another vehicle will collide with the side surface of the vehicle;

a physical quantity determination unit configured to determine a physical quantity relationship between relative physical quantities of the another vehicle and the vehicle; and a brake control unit configured to individually and independently control brakes corresponding to respective vehicle wheels, and to cause a braking force of the brakes on a collision side and a braking force of the brakes on a non-collision side to differ from each other, in accordance with the physical quantity relationship determined by the physical quantity determination unit, in a case that a collision is predicted by the collision prediction unit.

A second aspect of the present invention is characterized by a vehicle behavior control method of controlling, using a processor, a behavior of a vehicle when another vehicle is predicted to collide with a side surface of the vehicle, wherein brakes corresponding to respective vehicle wheels are allowed to be individually and independently controlled, the vehicle behavior control method comprising:

an other vehicle detecting step of detecting the another vehicle;

a collision predicting step of predicting that the another vehicle will collide with the side surface of the vehicle;

a physical quantity determination step of determining a physical quantity relationship between relative physical quantities of the another vehicle and the vehicle; and a brake controlling step of causing a braking force of the brakes on a collision side and a braking force of the brakes on a non-collision side to differ from each other, in accordance with the physical quantity relationship determined in the physical quantity determination step, in a case that a collision is predicted in the collision predicting step.

According to the present invention, with a simple control, it is possible to stabilize the behavior of the vehicle in the roll direction, in the case that another vehicle collides with a side surface of the vehicle.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE PREFERRED EMBODIMENTS

Preferred embodiments of a vehicle behavior control device and a vehicle behavior control method according to the present invention will be presented and described in detail below with reference to the accompanying drawings.

1. First Embodiment

[1.1. Configuration of Vehicle Behavior Control Device 10]

Figure 1:
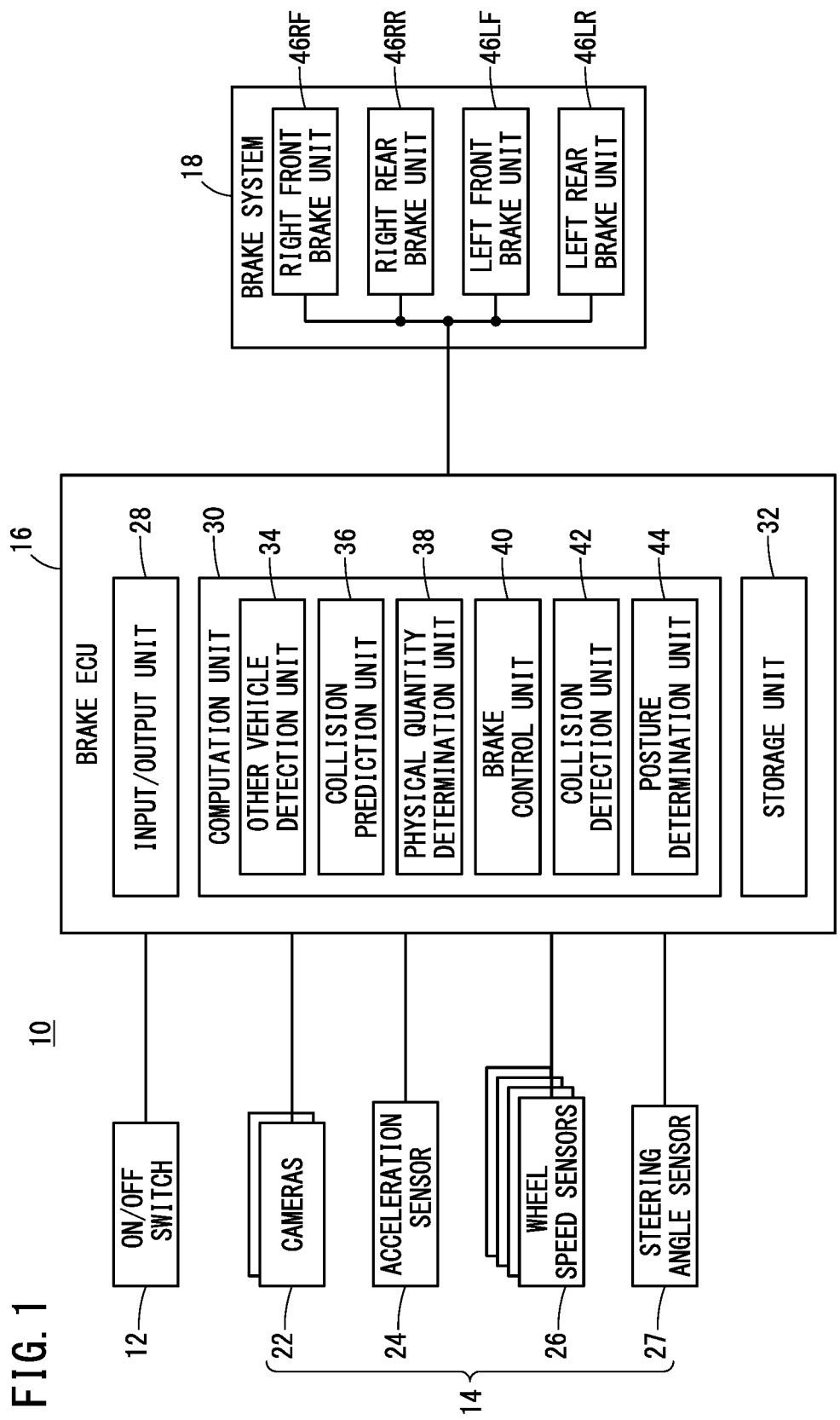
FIG. 1 is a diagram showing the configuration of a vehicle behavior control device according to a first embodiment.

As shown in FIG. 1, the vehicle behavior control device 10 is disposed in a user's own vehicle 80 (see FIGS. 2A to 2F, etc.), and is equipped with an ON/OFF switch 12, a sensor group 14, a brake ECU 16, and a brake system 18.

The ON/OFF switch 12 is a user interface provided in the interior of the vehicle. The ON/OFF switch 12 outputs to the brake ECU 16 an operation start command in response to an ON operation performed by a vehicle occupant, and outputs to the brake ECU 16 an operation stop command in response to an OFF operation performed by the vehicle occupant.

In the sensor group 14, there are included cameras 22, an acceleration sensor 24, wheel speed sensors 26, and a steering angle sensor 27. One or more cameras 22 are provided respectively on each of the left and right sides of the user's own vehicle 80. By the one or more cameras 22 provided on the right side of the user's own vehicle 80, images are captured of the right front direction, the right center direction, and the right rear direction of the user's own vehicle 80. Similarly, by the one or more cameras 22 provided on the left side of the user's own vehicle 80, images are captured of the left front direction, the left center direction, and the left rear direction of the user's own vehicle 80. The cameras 22 output captured image information to the brake ECU 16. Moreover, instead of the cameras 22, sensing devices such as radar devices, LiDAR devices, or SONAR devices may be provided. The acceleration sensor 24 measures acceleration (including deceleration) in three directions of the XYZ axes (a roll axis, a pitch axis, and a yaw axis). The acceleration sensor 24 outputs information of the measured acceleration to the brake ECU 16. The wheel speed sensors 26 are provided corresponding to each of the vehicle wheels of the user's own vehicle 80. The wheel speed sensors 26 output information of the measured wheel speeds to the brake ECU 16. The steering angle sensor 27 measures a steering angle (an operating angle of the steering wheel or a steering angle of the vehicle wheels). The steering angle sensor 27 outputs information of the measured steering angle to the brake ECU 16.

The brake ECU 16 includes an input/output unit 28, a computation unit 30, and a storage unit 32. The input/output unit 28 is constituted by an A/D conversion circuit, a communication interface, a driver, and the like. The computation unit 30 is constituted from a processor equipped with, for example, a CPU or the like. The computation unit 30 realizes various functions by executing programs stored in the storage unit 32. In the present embodiment, the computation unit 30 functions as an other vehicle detection unit 34, a collision prediction unit 36, a physical quantity determination unit 38, a brake control unit 40, a collision detection unit 42, and a posture determination unit 44.

The other vehicle detection unit 34 detects another vehicle 90 by carrying out image recognition using the image information captured by the cameras 22. The collision prediction unit 36 predicts that the other vehicle 90 will collide with a side surface 82 of the user's own vehicle 80 (see FIGS. 2A to 2F, etc.), based on the detection result of the other vehicle detection unit 34, and the wheel speeds (vehicle speed) measured by the wheel speed sensors 26. The physical quantity determination unit 38 determines a physical quantity relationship between relative physical quantities of the other vehicle 90 and the user's own vehicle 80, based on the detection result of the other vehicle detection unit 34, and vehicle information that is stored by the storage unit 32. The physical quantity, for example, is a vehicle height, a volume, a weight, or the like. The physical quantity which is used in the present embodiment is the vehicle height. The brake control unit 40 controls each of the brakes independently, by outputting command signals to each of the brakes of the brake system 18. In the case that a collision is predicted by the collision prediction unit 36, the brake control unit 40 performs a control to cause the braking force of the brakes on a collision side and a braking force of the brakes on a non-collision side to differ from each other, in accordance with the physical quantity relationship determined by the physical quantity determination unit 38. The collision detection unit 42 detects collision of the other vehicle 90 with the side surface 82 of the user's own vehicle 80 (see FIGS. 2A to 2F, etc.), based on the acceleration measured by the acceleration sensor 24. The posture determination unit 44 determines the posture of the user's own vehicle 80, based on the acceleration measured by the acceleration sensor 24.

The storage unit 32 is constituted by a RAM and a ROM or the like. The storage unit 32 stores, in addition to various programs, various information used by processes of the computation unit 30. In this instance, the storage unit 32 stores vehicle information for the user's own vehicle 80. The vehicle information includes information indicating the physical quantity of the user's own vehicle 80. Further, in the vehicle information, there may be included information that links the vehicle type of the other vehicle 90, the characteristics of the external appearance of such a vehicle type, and the physical quantity of such a vehicle type.

The brake system 18 includes four brakes, and more specifically, a right front brake unit 46RF, a right rear brake unit 46RR, a left front brake unit 46LF, and a left rear brake unit 46LR, which apply braking to the respective vehicle wheels, in this case four wheels. Each of the brakes applies braking to its corresponding wheel in response to a command signal output from the brake ECU 16.

[1.2. Transitioning of Brake Control at the Time of a Side Collision]

Transitioning of the brake control performed by the vehicle behavior control device 10 before and after a side collision has taken place will be described with reference to FIGS. 2A to 2F and FIGS. 3A to 3F. Moreover, in FIGS. 2A to 2F and FIGS. 3A to 3F, the left-right direction of the paper surface corresponds to a left-right direction of the user's own vehicle 80, the rearward (inward) direction of the paper surface corresponds to a frontward direction of the user's own vehicle 80, and a frontward (outward) direction of the paper surface corresponds to a rearward direction of the user's own vehicle 80.

Further, in FIGS. 2A to 2F and FIGS. 3A to 3F, among right wheels 84R (front and rear wheels on the right side) and left wheels 84L (front and rear wheels on the left side), the front and rear wheels on a side subjected to strong braking are shown by hatching.

In the following description, among the left and right sides of the user's own vehicle 80, a direction of the side surface 82 for which it is predicted that a collision will occur, and a direction of the side surface 82 where the collision has occurred are referred to as a "collision side".

Further, among the left and right sides of the user's own vehicle 80, a direction of the side surface 82 for which it is not predicted that a collision will occur, and a direction of the side surface 82 where the collision has not occurred are referred to as a "non-collision side". In the examples shown in FIGS. 2A to 2F and FIGS. 3A to 3F, the right side is the collision side, and the left side is the non-collision side.

[2.1. Situation in which Other Vehicle 90 Having a Lower Vehicle Height Collides with Side Surface 82 of User's Own Vehicle 80]

In the case that the vehicle height of the other vehicle 90 is lower than the vehicle height of the user's own vehicle 80, the brake control unit 40 causes the operating state of the brakes to undergo a transition as shown in FIGS. 2A to 2F.

Figure 2A:
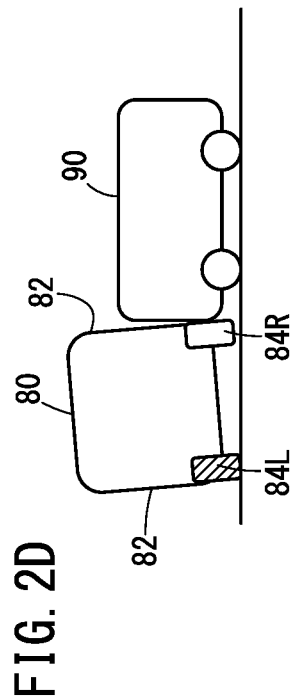
FIGS. 2A, 2B, 2C, 2D, 2E, and 2F are views showing six scenarios before and after a collision of another vehicle having a lower vehicle height on a right side surface of a user's own vehicle, along with operating states of the brakes in each of the scenarios.

FIG. 2A shows states of the user's own vehicle 80 and the other vehicle 90 when the time to collision (hereinafter referred to as a TTC) has become less than or equal to a predetermined control starting time period. At this time, the brake control unit 40 generates a braking force for the brakes on the right side, which is the collision side, in particular, the right front brake unit 46RF and the right rear brake unit 46RR. Upon doing so, the right wheels 84R are subjected to braking. At this time, the brake control unit 40 may generate a braking force for the brakes on the left side, which is the non-collision side, in particular, the left front brake unit 46LF and the left rear brake unit 46LR. However, in the case that the braking force of the brakes on the left side is generated, the brake control unit 40 makes the braking force of the brakes on the left side weaker than the braking force of the brakes on the right side. Due to the control performed by the brake control unit 40, the user's own vehicle 80 becomes inclined in a sunken-in manner toward the right side.

Figure 2B:
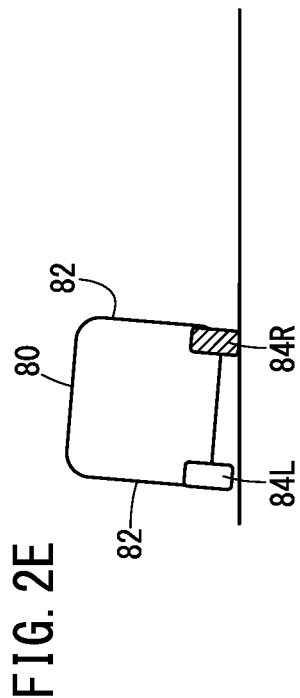
Figure 2C:
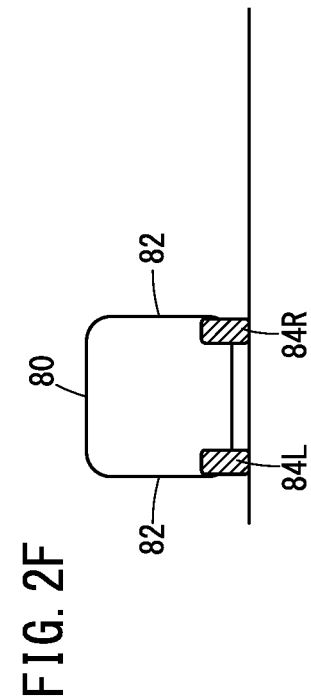

FIG. 2B shows states of the user's own vehicle 80 and the other vehicle 90 at the moment of a collision (TTC=0). FIG. 2C shows states of the user's own vehicle 80 and the other vehicle 90 immediately after the collision has occurred. At the moment of the collision and immediately after the collision has occurred, the brake control unit 40 maintains the operating state of the brake system 18 prior to the collision (see FIG. 2A). As a result, the braked state of the right wheels 84R is maintained.

Figure 2D:
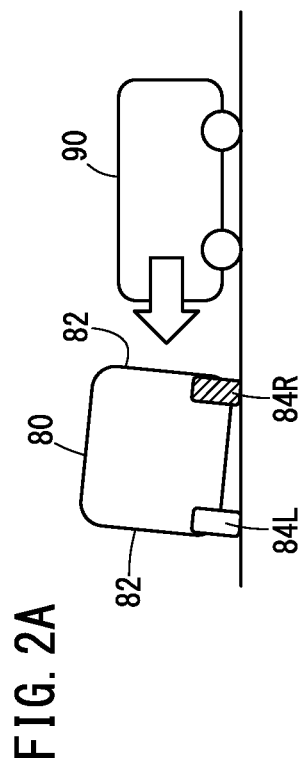
Figure 2E:
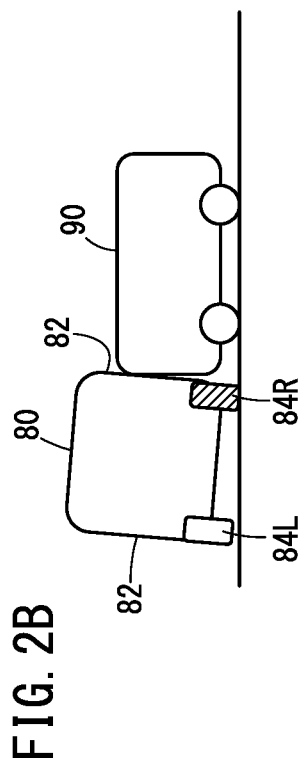

FIG. 2D shows states of the user's own vehicle 80 and the other vehicle 90 after the collision (following an elapse of time immediately after the collision has occurred). FIG. 2E shows a state of the user's own vehicle 80 following a further elapse of time after the point in time shown in FIG. 2D. After the collision, the brake control unit 40 controls the operating state of the brake system 18 depending on the roll direction. More specifically, in the case that the roll direction is a direction of turning to the left, the brake control unit 40 makes the braking force of the brakes on the left side stronger than the braking force of the brakes on the right side. Upon doing so, as shown in FIG. 2D, the left wheels 84L are subjected to braking. On the other hand, in the case that the roll direction is a direction of turning to the right, the brake control unit 40 makes the braking force of the brakes on the right side stronger than the braking force of the brakes on the left side. Upon doing so, as shown in FIG. 2E, the right wheels 84R are subjected to braking.

Figure 2F:
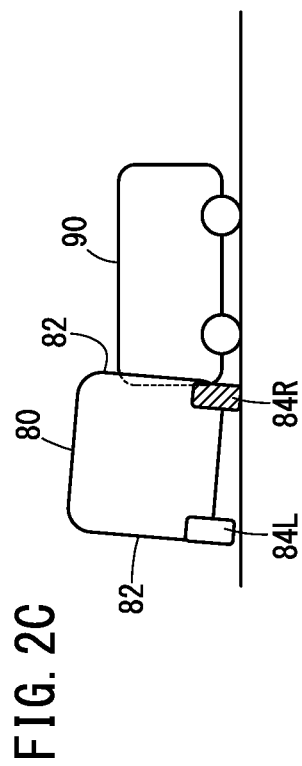

FIG. 2F shows a state in which the user's own vehicle 80 is stopped at a point in time after the point in time shown in FIG. 2E. The brake control unit 40 locks all of the brakes. Upon doing so, the left wheels 84L and the right wheels 84R are stopped. At this time, the brake control unit 40 may also cause the parking brake to be operated.

[2.2. Situation in which Other Vehicle 90 Having a Higher Vehicle Height Collides with Side Surface 82 of User's Own Vehicle 80]

In the case that the vehicle height of the other vehicle 90 is higher than the vehicle height of the user's own vehicle 80, the brake control unit 40 causes the operating state of the brakes to undergo a transition as shown in FIGS. 3A to 3F. Moreover, in the description given below, weakening of the braking force of the brakes also includes releasing of the brakes.

Figure 3A:
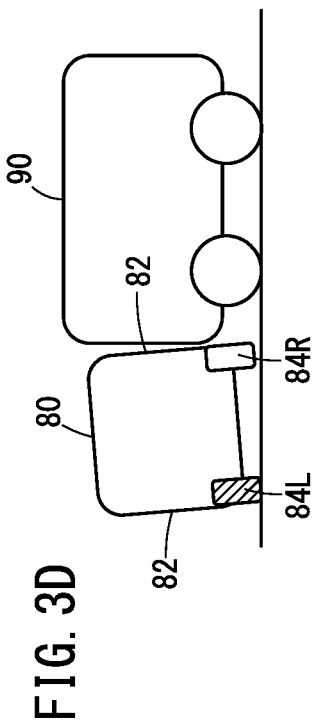
FIGS. 3A, 3B, 3C, 3D, 3E, and 3F are views showing six scenarios before and after a collision of another vehicle having a higher vehicle height on a right side surface of a user's own vehicle, along with operating states of the brakes in each of the scenarios.

FIG. 3A shows states of the user's own vehicle 80 and the other vehicle 90 when the TTC has become less than or equal to the predetermined control starting time period. At this time, the brake control unit 40 generates a braking force for the brakes on the left side, which is the non-collision side, in particular, the left front brake unit 46LF and the left rear brake unit 46LR. Upon doing so, the left wheels 84L are subjected to braking. At this time, the brake control unit 40 may generate a braking force for the brakes on the right side, which is the collision side, in particular, the right front brake unit 46RF and the right rear brake unit 46RR. However, in the case that the braking force of the brakes on the right side is generated, the brake control unit 40 makes the braking force of the brakes on the right side weaker than the braking force of the brakes on the left side. Due to the control performed by the brake control unit 40, the user's own vehicle 80 becomes inclined in a sunken-in manner toward the left side.

Figure 3D:
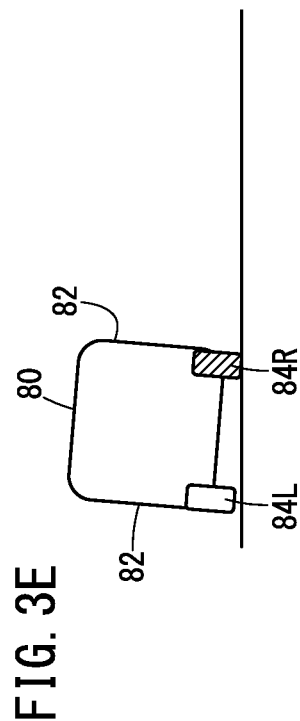
Figure 3B:
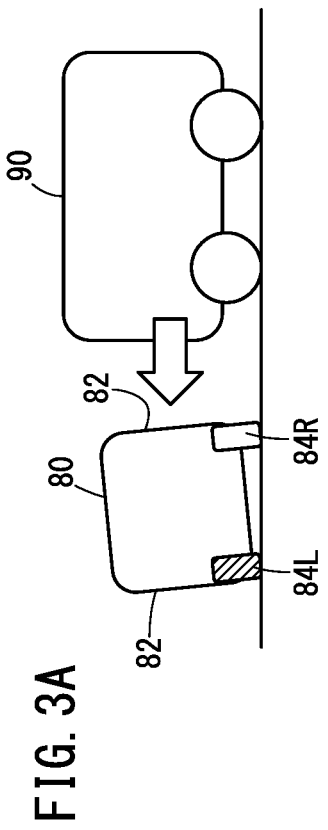
Figure 3E:
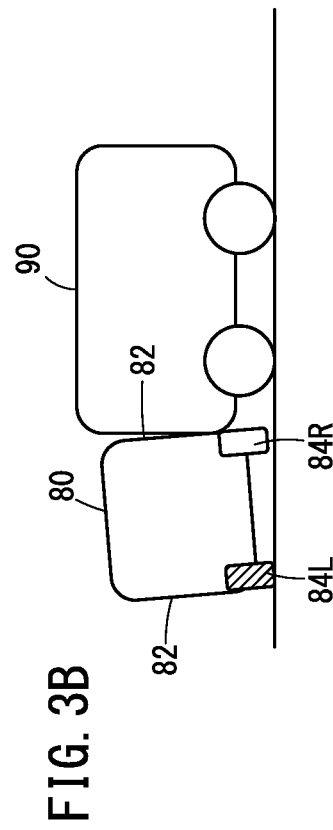
Figure 3C:
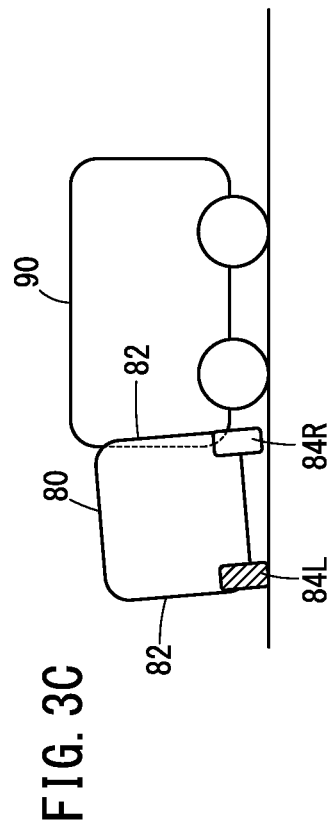

FIG. 3B shows states of the user's own vehicle 80 and the other vehicle 90 at the moment of a collision (TTC=0). FIG. 3C shows states of the user's own vehicle 80 and the other vehicle 90 immediately after the collision has occurred. At the moment of the collision and immediately after the collision has occurred, the brake control unit 40 maintains the operating state of the brake system 18 prior to the collision (see FIG. 3A). As a result, the braked state of the left wheels 84L is maintained.

Figure 3F:
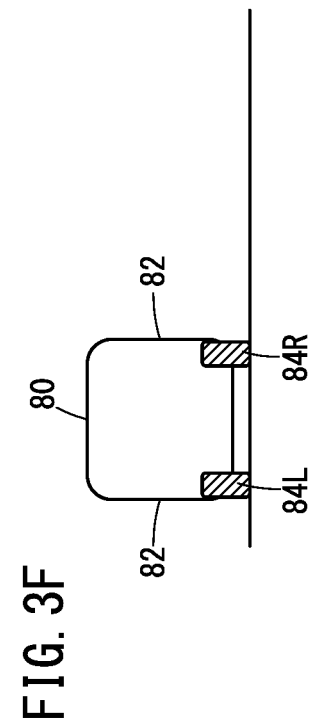

FIG. 3D shows states of the user's own vehicle 80 and the other vehicle 90 after the collision (following an elapse of time immediately after the collision has occurred). FIG. 3E shows a state of the user's own vehicle 80 following a further elapse of time after the point in time shown in FIG. 3D. FIG. 3F shows a state in which the user's own vehicle 80 is stopped at a point in time after the point in time shown in FIG. 3E. The brake control from after the collision until the user's own vehicle 80 comes to a stop is the same as the brake control that was described in [2.1] above with reference to FIGS. 2D to 2F.

[2.3. Vehicle Behavior Control Process]

When the ON/OFF switch 12 is turned ON, the process described below is initiated. Further, when the ON/OFF switch 12 is turned OFF, the process described below is terminated.

Figure 4:
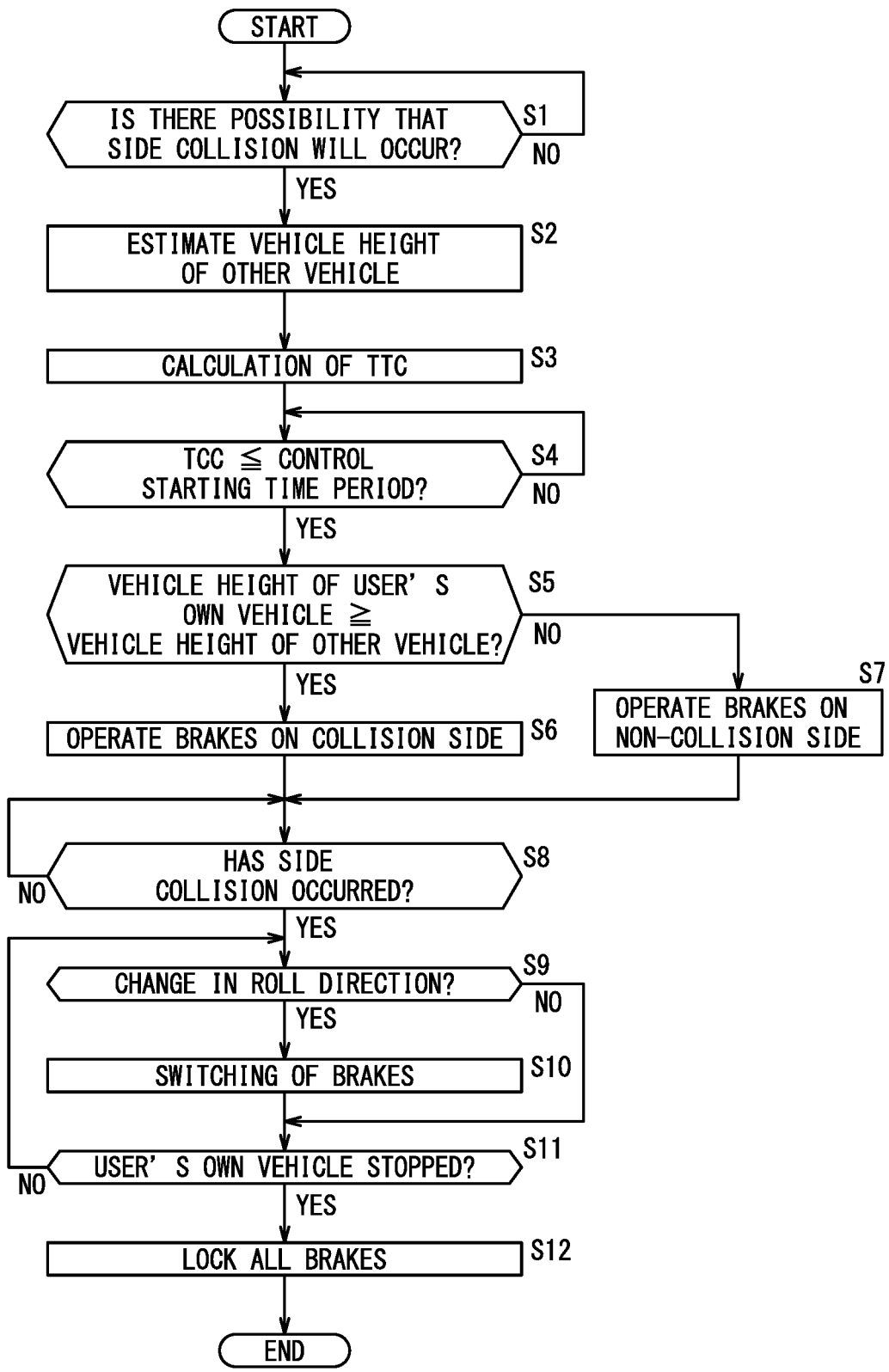
FIG. 4 is a flowchart showing the process flow of a vehicle behavior control.

In step S1 of FIG. 4, the collision prediction unit 36 determines whether or not there is a possibility that a side collision will occur. For example, the other vehicle detection unit 34 and the collision prediction unit 36 perform the following processes. The other vehicle detection unit 34 detects the other vehicle 90 on the basis of the image information. Based on the image information over a predetermined period of time, the collision prediction unit 36 obtains the travel locus of the other vehicle 90 up to the present time and the travel speed of the other vehicle 90 at the present time. Furthermore, based on the travel locus and the travel speed of the other vehicle 90, the collision prediction unit 36 predicts a planned travel position (planned travel trajectory) and a planned travel time for the other vehicle 90. Further, the collision prediction unit 36 predicts a planned travel position (planned travel trajectory) and a planned travel time for the user's own vehicle 80, based on the steering angle measured by the steering angle sensor 27 and the wheel speeds measured by the wheel speed sensors 26. In the case that a position exists that coincides with the planned travel position of the user's own vehicle 80 and the planned travel position of the other vehicle 90, and further, the planned travel time of the other vehicle 90 is later than the planned travel time of the user's own vehicle 80 at that position by only a slight or negligible amount of time, the collision prediction unit 36 determines that there is a possibility that a side collision may occur. The collision prediction unit 36 sets the position as a planned collision site. Further, the collision prediction unit 36 predicts the direction (the side of the collision) in which the side collision occurs. If there is a possibility that a side collision may occur (step S1: YES), the process transitions to step S2. On the other hand, if there is not a possibility that a side collision will occur (step S1: NO), the process of step S1 is repeatedly executed.

In step S2, the physical quantity determination unit 38 estimates the vehicle height of the other vehicle 90 on the basis of the image information. The physical quantity determination unit 38 may recognize an outer shape of the other vehicle 90 based on the image information, and calculate the vehicle height from the outer shape. Alternatively, the physical quantity determination unit 38 may recognize the external appearance of the other vehicle 90 based on the image information, and may obtain, from the vehicle information stored in the storage unit 32, the vehicle height for a type of vehicle that matches the external appearance. Upon completion of step S2, the process transitions to step S3.

In step S3, the collision prediction unit 36 calculates a time period until reaching the planned collision site, based on the relative speed between the user's own vehicle 80 and the other vehicle 90, and the inter-vehicular distance between the vehicles. This time period corresponds to the TTC. Upon completion of step S3, the process transitions to step S4.

In step S4, the collision prediction unit 36 compares the TTC with the predetermined control starting time period. The control starting time period is a time period to a timing at which the behavior control by brake control is started, and is stored in advance in the storage unit 32. In the case that the TTC is less than or equal to the control starting time period (step S4: YES), the process transitions to step S5. On the other hand, in the case that the TTC is greater than the control starting time period (step S4: NO), the process of step S4 is repeatedly executed.

In step S5, using the vehicle information stored in the storage unit 32 and the result of the estimation made in step S2, the physical quantity determination unit 38 compares the vehicle height of the user's own vehicle 80 and the vehicle height of the other vehicle 90. In the case that the vehicle height of the user's own vehicle 80 is greater than or equal to the vehicle height of the other vehicle 90 (step S5: YES), the process transitions to step S6. On the other hand, in the case that the vehicle height of the user's own vehicle 80 is less than the vehicle height of the other vehicle 90 (step S5: NO), the process transitions to step S7.

In step S6, the brake control unit 40 operates the brakes on the side of the collision. At this time, as shown in FIG. 2A, the user's own vehicle 80 is inclined in a sunken-in manner on the side of the collision (the right side in FIG. 2A). Upon completion of step S6, the process transitions to step S8.

In step S7, the brake control unit 40 operates the brakes on the side where the collision does not take place. At this time, as shown in FIG. 3A, the user's own vehicle 80 is inclined in a sunken-in manner on the side where the collision does not take place (the left side in FIG. 3A). Upon completion of step S7, the process transitions to step S8.

In step S8, the collision detection unit 42 determines whether or not a side collision has occurred. As shown in FIGS. 2C and 3C, immediately after the side collision has occurred, in the user's own vehicle 80, an acceleration which is particular to a side collision is generated in each of the axial directions. The collision detection unit 42 determines that the side collision has occurred, in the case that the acceleration in each of the axial directions as measured by the acceleration sensor 24 indicates an acceleration particular to a side collision. In the case that a side collision has occurred (step S8: YES), the process transitions to step S9. On the other hand, in the case that a side collision has not occurred (step S8: NO), the process of step S8 is repeatedly executed. At this time, the operating states of the brakes are maintained.

In step S9, the posture determination unit 44 determines whether or not the roll direction has changed. Immediately after the side collision, the user's own vehicle 80 rolls in a non-collision direction (i.e., the direction of the side where the collision did not take place) (see FIGS. 2C to 2D and FIGS. 3C to 3D). Thereafter, the roll direction undergoes a change, and the user's own vehicle 80 rolls in the direction of the collision (see FIGS. 2D to 2E and FIGS. 3D to 3E). Furthermore, thereafter, there may be cases in which the roll direction changes once or more than once. The posture determination unit 44 detects such a change in the roll direction, based on an acceleration of the roll axis as measured by the acceleration sensor 24. In the case that the roll direction has changed (step S9: YES), the process transitions to step S10. On the other hand, in the case that the roll direction has not changed (step S9: NO), the process transitions to step S11.

In step S10, the brake control unit 40 switches the strength/weakness of the left and right brakes. For example, in the case that the roll direction has changed from the non-collision side to the collision side, the brake control unit 40 strengthens the braking force of the brakes on the collision side, and weakens the braking force of the brakes on the non-collision side. As a result, the braking force of the brakes on the collision side becomes stronger than the braking force of the brakes on the non-collision side (a transition takes place from the state shown in FIG. 2D to the state shown in FIG. 2E and a transition takes place from the state shown in FIG. 3D to the state shown in FIG. 3E). For example, in the case that the roll direction has changed from the collision side to the non-collision side, the brake control unit 40 strengthens the braking force of the brakes on the non-collision side, and weakens the braking force of the brakes on the collision side. As a result, the braking force of the brakes on the non-collision side becomes stronger than the braking force of the brakes on the collision side (a transition takes place from the state shown in FIG. 2E to the state shown in FIG. 2D and a transition takes place from the state shown in FIG. 3E to the state shown in FIG. 3D).

In step S11, the posture determination unit 44 determines whether or not the user's own vehicle 80 has come to a stop. The posture determination unit 44 determines that the user's own vehicle 80 has come to a stop, in the case that the acceleration in each of the axial directions measured by the acceleration sensor 24 has become zero. In the case that the user's own vehicle 80 has come to a stop (step S11: YES), the process transitions to step S12. On the other hand, in the case that the user's own vehicle 80 has not come to a stop (step S11: NO), the process returns to step S9.

In step S12, the brake control unit 40 locks all of the brakes. The above step completes the series of vehicle behavior control processes.

2. Second Embodiment

Figure 5:
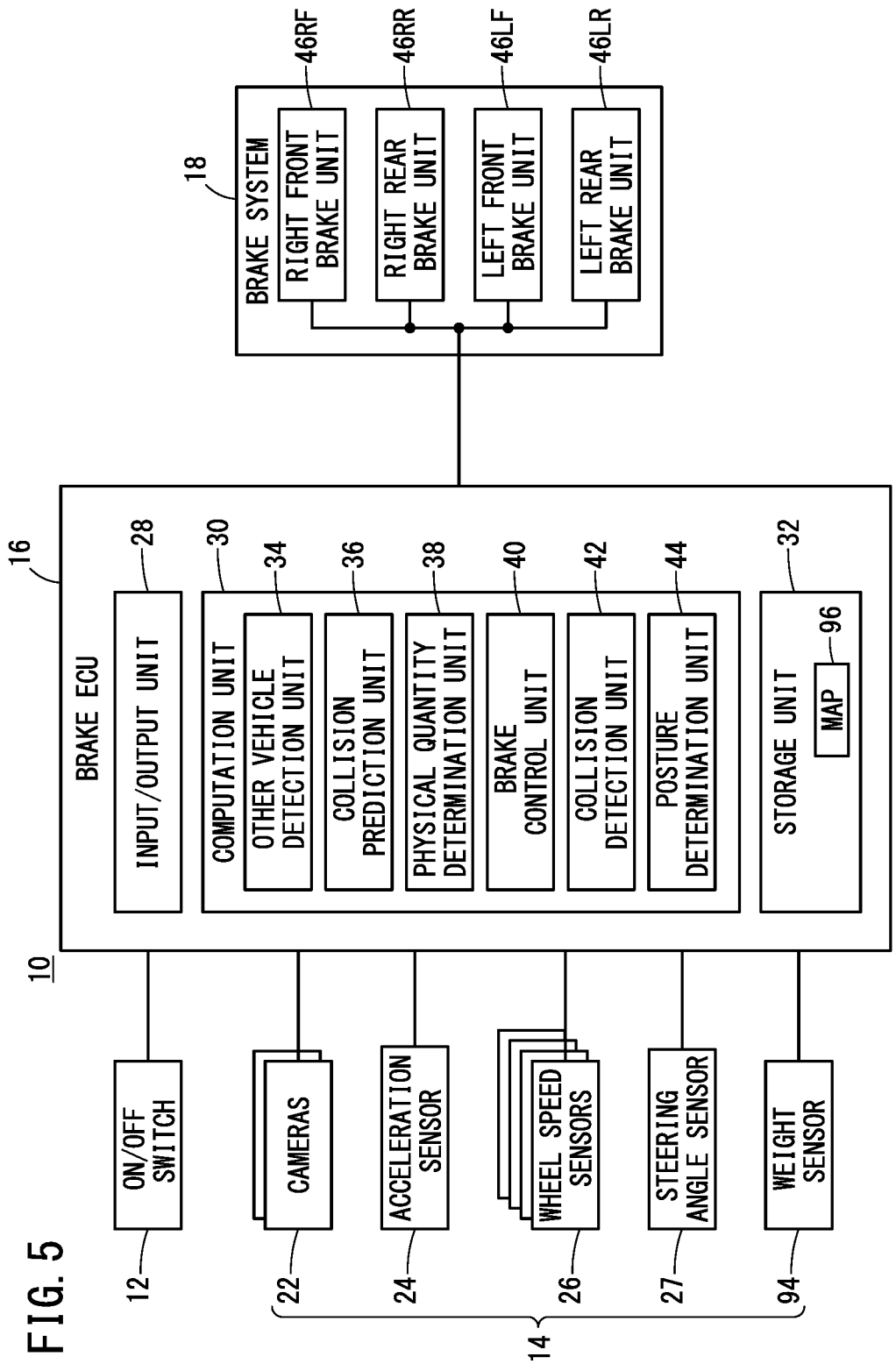
FIG. 5 is a diagram showing the configuration of a vehicle behavior control device according to a second embodiment.

As shown in FIG. 5, the vehicle behavior control device 10 according to the second embodiment is further equipped with a weight sensor 94 in addition to each of the constituent elements of the vehicle behavior control device 10 according to the first embodiment. The weight sensor 94 measures the weight of the user's own vehicle 80 other than the weight of the vehicle body. For example, as the weight sensor 94, there can be used seat sensors that measure the weight of each of the vehicle occupants, a stroke sensor that measures an amount of sinkage of the suspension, or the like. The weight sensor 94 outputs information of the measured weight to the brake ECU 16.

Based on the weight information output by the weight sensor 94, the computation unit 30 changes the timing at which switching of the strength/weakness of the left and right brakes takes place, and the time period for which the brakes are operated. For example, the storage unit 32 stores a map 96 that associates the weights with delay time periods. The brake control unit 40 obtains from the map 96 the delay time period in accordance with the weight. In addition, in step S10 of FIG. 4, the brake control unit 40 switches the strength/weakness of the left and right brakes, after the delay time period has elapsed from the roll direction having been changed. Similarly, the brake control unit 40 may determine the time period for which the brakes are operated in accordance with the weight.

3. Other Examples

The vehicle behavior control device 10 may include a positioning device such as a GPS, a steering angle sensor, or the like. In this case, the collision prediction unit 36 may predict the planned travel position and the planned travel time period for the user's own vehicle 80 using the positioning device such as the GPS, the steering angle sensor, or the like.

The vehicle behavior control device 10 may include a communication device that performs inter-vehicle communications with the other vehicle 90. In this case, the collision prediction unit 36 may acquire information such as the travel locus, the planned travel trajectory, the travel speed, and the like from the other vehicle 90 by way of inter-vehicle communications.

The physical quantity determination unit 38 may utilize as the physical quantities information concerning the height of a center of gravity of the user's own vehicle 80, and information concerning the position of the collision (for example, the height position of a front end) of the other vehicle 90. Further, the physical quantity determination unit 38 may utilize as the physical quantities information concerning the body types of the user's own vehicle 80 and the other vehicle 90.

4. Technical Concepts Obtained from the Embodiments

Technical concepts that can be grasped from the above-described embodiments will be described below.

The first aspect of the present invention is characterized by the vehicle behavior control device 10 that controls the behavior of the user's own vehicle 80 when the other vehicle 90 is predicted to collide with the side surface 82 of the user's own vehicle 80, the vehicle behavior control device comprising:

the other vehicle detection unit 34 that detects the other vehicle 90;

the collision prediction unit 36 which predicts that the other vehicle 90 will collide with the side surface 82 of the user's own vehicle 80;

the physical quantity determination unit 38 that determines the physical quantity relationship between the relative physical quantities of the other vehicle 90 and the user's own vehicle 80; and the brake control unit 40 which is capable of individually and independently controlling the brakes (the right front brake unit 46RF, the right rear brake unit 46RR, the left front brake unit 46LF, and the left rear brake unit 46LR) corresponding to the respective vehicle wheels (the right wheels 84R and the left wheels 84L), and which causes the braking force of the brakes on the collision side and the braking force of the brakes on the non-collision side to differ from each other, in accordance with the physical quantity relationship determined by the physical quantity determination unit 38, in the case that the collision is predicted by the collision prediction unit 36.

When the braking force of the brakes on the collision side and the non-collision side are made to differ from each other, as in the above-described configuration, one of the braking forces becomes stronger than the other braking force, and a variation in the roll direction of the user's own vehicle 80 becomes smaller. Therefore, in accordance with the above-described configuration, the behavior of the user's own vehicle 80 in the roll direction can be stabilized. Further, the control in which the braking force of the brakes on the collision side and the braking force of the brakes on the non-collision side are made to differ in accordance with the physical quantity relationship between the relative physical quantities of the other vehicle 90 and the user's own vehicle 80 is a simpler control as compared with a precise control for each of the vehicle wheels. Consequently, according to the above-described configuration, with a simple control, it is possible to stabilize the behavior of the user's own vehicle 80 in the roll direction, in the case that the other vehicle 90 collides with the side surface 82 of the user's own vehicle 80.

In the first aspect, the collision prediction unit 36 may predict the time of the collision of the other vehicle 90 with the side surface 82 of the user's own vehicle 80; and in the case that the physical quantity determination unit 38 determines that the physical quantity of the other vehicle 90 is less than the physical quantity of the user's own vehicle 80, the brake control unit 40 may make the braking force of the brakes (the right front brake unit 46RF and the right rear brake unit 46RR) on the collision side greater than the braking force of the brakes (the left front brake unit 46LF and the left rear brake unit 46LR) on the non-collision side at a predetermined time (control starting time period) prior to the time of the collision, and may make the braking force of the brakes on the non-collision side greater than the braking force of the brakes on the collision side after the collision.

In accordance with the above-described configuration, since the brake control is performed prior to the collision, the behavior of the user's own vehicle 80 in the roll direction can be made more stable.

In the first aspect, the collision prediction unit 36 may predict the time of the collision of the other vehicle 90 with the side surface 82 of the user's own vehicle 80; and in the case that the physical quantity determination unit 38 determines that the physical quantity of the other vehicle 90 is greater than the physical quantity of the user's own vehicle 80, the brake control unit 40 may make the braking force of the brakes (the left front brake unit 46LF and the left rear brake unit 46LR) on the non-collision side greater than the braking force of the brakes (the right front brake unit 46RF and the right rear brake unit 46RR) on the collision side at a predetermined time (control starting time period) prior to the time of the collision.

In accordance with the above-described configuration, since the brake control is performed prior to the collision, the behavior of the user's own vehicle 80 in the roll direction can be made more stable. Further, in accordance with the above-described configuration, since the impact of the collision can be absorbed by the surface, the behavior of the user's own vehicle 80 in the roll direction can be made more stable.

In the first aspect, there may further be provided the posture determination unit 44 that determines the posture of the user's own vehicle 80;

wherein, after the collision, the brake control unit 40 may perform a control to cause the braking force of the brakes on the collision side and the braking force of the brakes on the non-collision side to differ from each other, and thereafter, may switch a strength of the braking force of the brakes between the collision side and the non-collision side in accordance with the posture of the user's own vehicle 80 determined by the posture determination unit 44.

In accordance with the above-described configuration, since the strength/weakness of the brakes are switched after the collision, the behavior of the user's own vehicle 80 in the roll direction can be made more stable.

The second aspect of the present invention is characterized by the vehicle behavior control method of controlling, using a processor (computation unit 30), the behavior of the user's own vehicle 80 when the other vehicle 90 is predicted to collide with the side surface 82 of the user's own vehicle 80, wherein the brakes (the right front brake unit 46RF, the right rear brake unit 46RR, the left front brake unit 46LF, and the left rear brake unit 46LR) corresponding to the respective vehicle wheels (the right wheels 84R and the left wheels 84L) are capable of being individually and independently controlled, the vehicle behavior control method comprising:

the other vehicle detecting step (step S1) of detecting the other vehicle 90;

the collision predicting step (step S1) of predicting that the other vehicle 90 will collide with the side surface 82 of the user's own vehicle 80;

the physical quantity determination step (step S2) of determining the physical quantity relationship between the relative physical quantities of the other vehicle 90 and the user's own vehicle 80; and the brake controlling step (step S6, step S7) of causing the braking force of the brakes on the collision side and the braking force of the brakes on the non-collision side to differ from each other, in accordance with the physical quantity relationship determined in the physical quantity determination step, in the case that the collision is predicted in the collision predicting step.

The vehicle behavior control device and the vehicle behavior control method according to the present invention are not limited to the embodiments described above, and it is a matter of course that various modified or additional configurations could be adopted therein without deviating from the essence and gist of the present invention.

What is claimed is:

1. A vehicle behavior control device that controls a behavior of a vehicle when another vehicle is predicted to collide with a side surface of the vehicle, the vehicle behavior control device comprising:

an other vehicle detection unit configured to detect the another vehicle;

a collision prediction unit configured to predict that the another vehicle will collide with the side surface of the vehicle;

a physical quantity determination unit configured to determine a physical quantity relationship between relative physical quantities of the another vehicle and the vehicle;

a brake control unit configured to individually and independently control brakes corresponding to respective vehicle wheels, and to cause a braking force of the brakes on a collision side and a braking force of the brakes on a non-collision side to differ from each other, in accordance with the physical quantity relationship determined by the physical quantity determination unit, in a case that a collision is predicted by the collision prediction unit; and a posture determination unit configured to determine a posture of the vehicle, wherein the brake control unit performs, after the collision, a control to cause the braking force of the brakes on the collision side and the braking force of the brakes on the non-collision side to differ from each other, and thereafter, performs, in a case that the posture determination unit determines that a roll direction has changed, a switching control that switches a strength of the braking force of the brakes between the collision side and the non-collision side, and performs, until the vehicle comes to a stop, the switching control every time the posture determination unit determines that the roll direction has changed.

2. The vehicle behavior control device according to claim 1, wherein:

the collision prediction unit predicts a time of the collision of the another vehicle with the side surface of the vehicle; and in a case that the physical quantity determination unit determines that the physical quantity of the another vehicle is less than the physical quantity of the vehicle, the brake control unit makes the braking force of the brakes on the collision side greater than the braking force of the brakes on the non-collision side at a predetermined time prior to the time of the collision, and makes the braking force of the brakes on the non-collision side greater than the braking force of the brakes on the collision side after the collision.

3. The vehicle behavior control device according to claim 1, wherein:

the collision prediction unit predicts a time of the collision of the another vehicle with the side surface of the vehicle; and in a case that the physical quantity determination unit determines that the physical quantity of the another vehicle is greater than the physical quantity of the vehicle, the brake control unit makes the braking force of the brakes on the non-collision side greater than the braking force of the brakes on the collision side at a predetermined time prior to the time of the collision.

4. A vehicle behavior control method of controlling, using a processor, a behavior of a vehicle when another vehicle is predicted to collide with a side surface of the vehicle, wherein brakes corresponding to respective vehicle wheels are allowed to be individually and independently controlled, the vehicle behavior control method comprising:

an other vehicle detecting step of detecting the another vehicle;

a collision predicting step of predicting that the another vehicle will collide with the side surface of the vehicle;

a physical quantity determination step of determining a physical quantity relationship between relative physical quantities of the another vehicle and the vehicle;

a brake controlling step of causing a braking force of the brakes on a collision side and a braking force of the brakes on a non-collision side to differ from each other, in accordance with the physical quantity relationship determined in the physical quantity determination step, in a case that a collision is predicted in the collision predicting step; and a posture determination step of determining a posture of the vehicle, wherein the brake controlling step performs, after the collision, a control to cause the braking force of the brakes on the collision side and the braking force of the brakes on the non-collision side to differ from each other, and thereafter, performs, in a case that the posture determination step determines that a roll direction has changed, a switching control that switches a strength of the braking force of the brakes between the collision side and the non-collision side, and performs, until the vehicle comes to a stop, the switching control every time the posture determination step determines that the roll direction has changed.

5. The vehicle behavior control device according to claim 1, wherein the posture determination unit determines, based on angular acceleration, whether or not the roll direction has changed.

* * * * *